US009374126B2

(12) United States Patent
Larsen et al.

(10) Patent No.: US 9,374,126 B2
(45) Date of Patent: Jun. 21, 2016

(54) MULTIBAND ON GROUND ANTENNA WITH A DUAL RADIATOR ARRANGEMENT

(71) Applicant: Nokia Corporation, Espoo (FI)

(72) Inventors: Niels Bonne Larsen, Encinitas, CA (US); Aycan Erentok, Sunnyvale, CA (US); Marko Olavi Kupari, Kempele (FI)

(73) Assignee: Nokia Technologies Oy, Espoo (FI)

( * ) Notice: Subject to any disclaimer, the term of this patent is extended or adjusted under 35 U.S.C. 154(b) by 19 days.

(21) Appl. No.: 14/092,179

(22) Filed: Nov. 27, 2013

(65) Prior Publication Data

US 2015/0147980 A1 May 28, 2015

(51) Int. Cl.
| H04B 1/40 | (2015.01) |
| H04B 1/50 | (2006.01) |
| H01Q 21/30 | (2006.01) |
| H01Q 5/314 | (2015.01) |
| H01Q 5/321 | (2015.01) |
| H01Q 5/328 | (2015.01) |
| H01Q 5/378 | (2015.01) |

(52) U.S. Cl.
CPC .................. *H04B 1/50* (2013.01); *H01Q 5/314* (2015.01); *H01Q 5/321* (2015.01); *H01Q 5/328* (2015.01); *H01Q 5/378* (2015.01); *H01Q 21/30* (2013.01)

(58) Field of Classification Search
CPC ......... H01Q 1/243; H01Q 21/28; H01Q 9/42; H01Q 1/245; H01Q 3/24; H01Q 7/00; H01Q 1/521; H01Q 9/0442; H01Q 1/36; H01Q 1/38; H01Q 1/52; H01Q 9/14; H01Q 25/04; H04B 15/02; H04B 1/3833; H04B 5/0081; H04B 7/0825; H04B 7/10; H04B 1/0053; H04B 1/3838

See application file for complete search history.

(56) References Cited

U.S. PATENT DOCUMENTS

| 6,757,267 | B1 * | 6/2004 | Evans ................. H04B 7/0615 342/374 |
| 7,274,340 | B2 | 9/2007 | Ozden et al. .................. 343/860 |
| 2007/0052599 | A1 * | 3/2007 | Shimizu et al. ............... 343/702 |
| 2009/0058554 | A1 | 3/2009 | Ozden ........................... 333/129 |
| 2009/0278755 | A1 * | 11/2009 | Shoji ........................ H01Q 1/24 343/745 |
| 2011/0116423 | A1 * | 5/2011 | Rousu .................... H01Q 1/242 370/297 |
| 2011/0183633 | A1 | 7/2011 | Ohba et al. |
| 2011/0234469 | A1 | 9/2011 | Shoji |
| 2012/0046003 | A1 * | 2/2012 | Ying ........................... 455/90.2 |
| 2013/0038494 | A1 | 2/2013 | Kuonanoja .................... 343/746 |
| 2013/0088404 | A1 * | 4/2013 | Ramachandran et al. .... 343/853 |
| 2013/0169490 | A1 * | 7/2013 | Pascolini et al. ............. 343/702 |

FOREIGN PATENT DOCUMENTS

| WO | WO-2010/039087 A1 | 4/2010 |
| WO | WO-2013/103564 A1 | 7/2013 |

* cited by examiner

*Primary Examiner* — Golam Sorowar

(74) *Attorney, Agent, or Firm* — Harrington & Smith

(57) ABSTRACT

An antenna arrangement includes a switch having an open state and a closed state, a first antenna that operates as a first active driven element in a first frequency band in response to the switch being in the open state, and a second antenna that operates as a second active driven element in a first frequency band in response to the switch being in the open state. The closed state configures the first antenna and the second antenna to operate in a second frequency band different from the first frequency band by operatively coupling a first impedance between the first antenna and a radio frequency ground, and by operatively coupling a second impedance between the second antenna and the radio frequency ground. The first antenna functions as a parasitic element in the second frequency band and the second antenna functions as an active driven element in the second frequency band.

32 Claims, 11 Drawing Sheets

| SYSTEM | FREQUENCY (MHz) |
|---|---|
| GSM850 | 824-849/869-894 |
| GSM900 | 880-915/925-960 |
| GSM1800 | 1710-1785/1805-1880 |
| GSM1900 | 1850-1910/1930-1990 |
| UMTSI | 1920-1980/2110-2170 |
| UMTSII | 1850-1910/1930-1990 |
| UMTSIII | 1710-1785/1805-1880 |
| UMTSIV | 1710-1755/2110-2155 |
| UMTSV | 824-849/869-894 |
| UMTSVI | 830-840/875-885 |
| UMTSVII | 2500-2570/2620-2690 |
| UMTSVIII | 880-915/925-960 |
| UMTSIX | 1750-1785/1845-1880 |

FIG.4

MULTIBAND ON GROUND ANTENNA WITH A DUAL RADIATOR ARRANGEMENT

TECHNICAL FIELD

This invention relates generally to wireless communications and, more specifically, to methods, apparatuses, and computer readable storage media for providing a multiband on-ground antenna with a dual radiator arrangement.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Various abbreviations that may appear in the description and drawings are defined as follows:
BW: bandwidth
ESD: electrostatic discharge
GSM: Global System for Mobile communications
HB: high band (generally >1 GHz)
LB: low band (generally <1 GHz)
RF: radio frequency
S-parameters: scattering parameters
S11: input reflection coefficient of Port 1
S22: input reflection coefficient of Port 2
SAR: specific absorption rate
SPST: single pole, single throw
Q: Quality factor
UMTS: Universal Mobile Telecommunications System
Z: complex input impedance Physically small antennas are utilized in modern portable electronic devices such as mobile phones. However, as the size of the antenna is reduced, it becomes more challenging to provide operation across a bandwidth that includes two or more separate, noncontiguous frequency bands of interest without incurring significant radiation losses. In general, decreasing the size of an antenna reduces the bandwidth and increases Q-value, which in turn decreases the number of possible frequency bands on which the antenna will operate with adequate radiation efficiency. For example, in order for a single antenna element to operate on the various frequency bands allocated to mobile phones in the US and Europe, the antenna and related matching circuitry needs to have wide bandwidth properties.

Conventionally, the use of matching components as well as radio frequency (RF) switches for switching additional ground connections in and out has enabled an increase in antenna bandwidth while maintaining adequate system radiation efficiency. However, as the antenna size is decreased below a certain level, the use of these conventional approaches is no longer adequate to achieve multiband operation across a plurality of noncontiguous frequency bands without incurring significant radiation losses.

The biological effects of RF radiation from mobile phones has been a subject of recent interest and study. Due to the fact that the antenna of a mobile device may be used in close proximity to the human body, antenna designs are required to take into consideration the rate at which RF energy radiated by the antenna is absorbed by the human body. This absorption is measured in terms of specific absorption rate (SAR) that indicates the amount of RF power absorbed per mass of tissue. Regardless of the size and configuration of an antenna design that is used for transmitting purposes, it is necessary to ensure that the combined SAR of a portable electronic device equipped with the antenna does not exceed the standards which have been promulgated by existing regulatory bodies. For example, in the United States, the Federal Communications Commission (FCC) requires that mobile phones have an SAR level at or below 1.6 watts per kilogram.

SUMMARY

According to one embodiment, a method comprises providing a first antenna and a second antenna both configured for operating as active driven antenna elements in a first frequency band; and configuring the first antenna and the second antenna to operate in a second frequency band different from the first frequency band by operatively coupling a first reactance or impedance between the first antenna and a radio frequency ground, and by operatively coupling a second reactance or impedance between the second antenna and the radio frequency ground, wherein the first antenna functions as a parasitic antenna element in the second frequency band and the second antenna functions as an active driven antenna element in the second frequency band.

According to another embodiment, an apparatus comprises at least one switch having an open state and a closed state; a first antenna configured for operating as a first active driven antenna element in a first frequency band in response to the at least one switch being in the open state; a second antenna configured for operating as a second active driven antenna element in a first frequency band in response to the at least one switch being in the open state; wherein the closed state configures the first antenna and the second antenna to operate in a second frequency band different from the first frequency band by operatively coupling a first reactance or impedance between the first antenna and a radio frequency ground, and by operatively coupling a second reactance or impedance between the second antenna and the radio frequency ground; and wherein the first antenna functions as a parasitic antenna element in the second frequency band and the second antenna functions as an active driven antenna element in the second frequency band.

According to another embodiment, a circuit arrangement comprises at least one switch having an open state and a closed state; a first antenna configured for operating as a first active driven antenna element in a first frequency band in response to the at least one switch being in the open state; a second antenna configured for operating as a second active driven antenna element in a first frequency band in response to the at least one switch being in the open state; wherein the closed state configures the first antenna and the second antenna to operate in a second frequency band different from the first frequency band by operatively coupling a first reactance or impedance between the first antenna and a radio frequency ground, and by operatively coupling a second reactance or impedance between the second antenna and the radio frequency ground; and wherein the first antenna functions as a parasitic antenna element in the second frequency band and the second antenna functions as an active driven antenna element in the second frequency band.

According to another embodiment, an apparatus comprises at least one processor and at least one memory including computer program code for one or more programs. The at least one memory and the computer program code are configured, with the at least one processor, to cause the apparatus to perform at least configuring a first antenna and a second antenna for operating as active driven antenna elements in a first frequency band; and configuring the first antenna and the second antenna to operate in a second frequency band different from the first frequency band by operatively coupling a first reactance or impedance between the first antenna and a radio frequency ground, and by operatively coupling a second reactance or impedance between the second antenna and the radio frequency ground, wherein the first antenna functions as a parasitic antenna element in the second frequency band and the second antenna as an active driven antenna element in the second frequency band.

According to another embodiment, a computer-readable storage medium carries one or more sequences of one or more instructions which, when executed by one or more processors, cause, at least in part, an apparatus to perform at least configuring a first antenna and a second antenna for operating as active driven antenna elements in a first frequency band; and configuring the first antenna and the second antenna to operate in a second frequency band different from the first frequency band by operatively coupling a first reactance or impedance between the first antenna and a radio frequency ground, and by operatively coupling a second reactance or impedance between the second antenna and the radio frequency ground, wherein the first antenna functions as a parasitic antenna element in the second frequency band and the second antenna as an active driven antenna element in the second frequency band.

In addition, for various exemplary embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various exemplary embodiments of the invention, the following is also applicable: a method comprising facilitating access to at least one interface configured to allow access to at least one service, the at least one service configured to perform any one or any combination of network or service provider methods (or processes) disclosed in this application.

For various exemplary embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various exemplary embodiments, the methods (or processes) can be accomplished on the service provider side or on the mobile device side or in any shared way between service provider and mobile device with actions being performed on both sides.

Still other aspects, features, technical effects, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

In the attached Figures:

FIG. 4 is a table listing a number of GSM and UMTS bands that it may be desired to accommodate with the antenna arrangement of FIG. 1 or FIG. 2.

DETAILED DESCRIPTION

Figure 1:
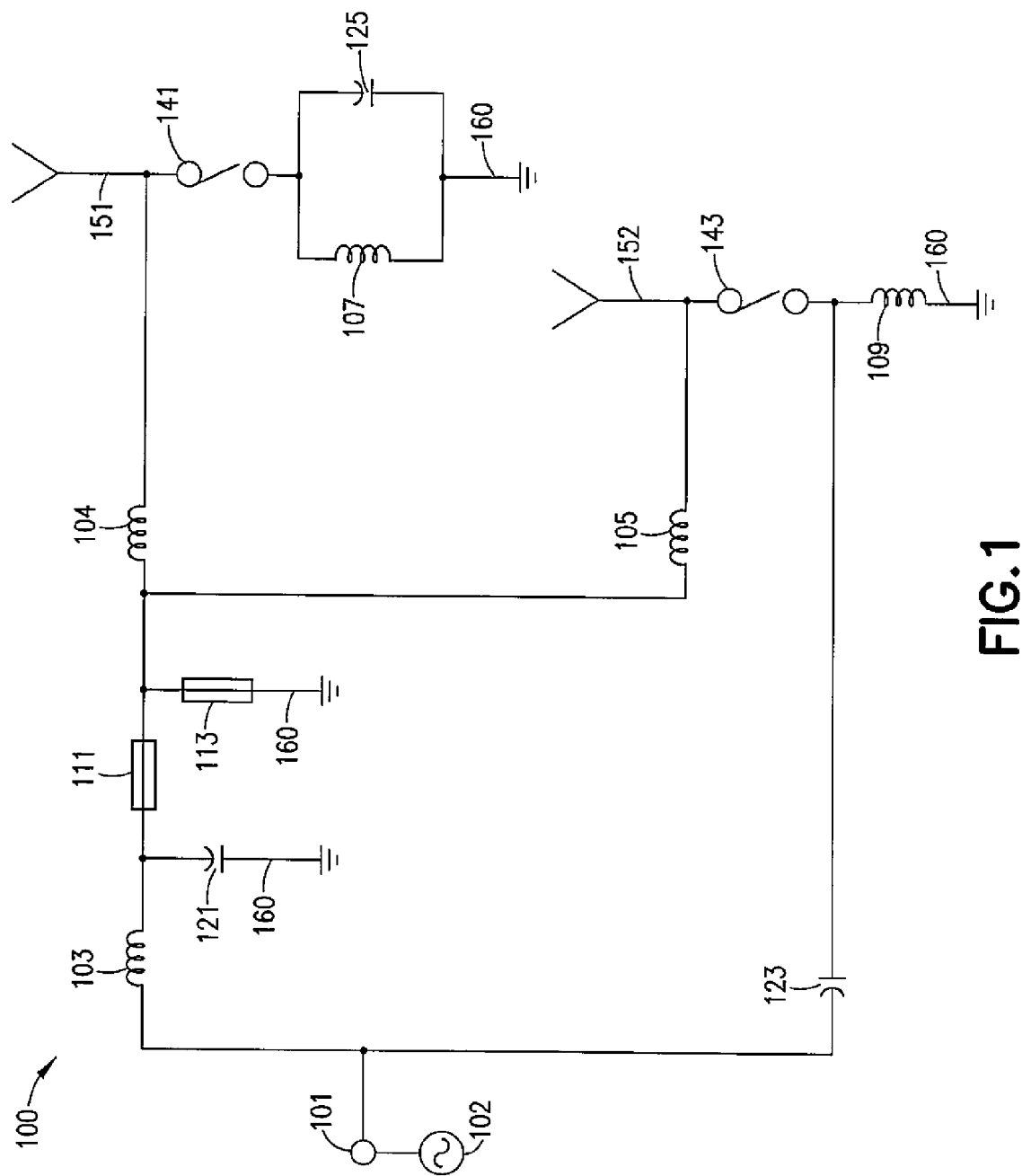
FIG. 1 is a schematic diagram of an antenna arrangement constructed in accordance with a set of exemplary embodiments of the invention.

Examples of a method, apparatus, and computer program product for providing a multiband on-ground antenna with a dual radiator arrangement are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

The use of the exemplary embodiments of the invention enables one to provide a small antenna for a mobile device through the use of a diplexer having a switching circuit component. The antenna used may be a diplexed high-band (HB) and low-band (LB) antenna. The exemplary embodiments of the invention provide a switchable antenna topology technique for diplexed antennas. For example, in LB, a switching mechanism is used to provide a first antenna topology which may comprise two active driven monopole antenna elements configured as a simple antenna array, whereas in HB, the switching mechanism is used to provide a second antenna topology which may comprise a single active driven monopole antenna element electromagnetically coupled to a non-driven parasitic antenna element. An active driven antenna element is defined as an antenna which is coupled to radio circuitry, with or without intervening components. In contrast, a parasitic antenna element is not actively driven but electromagnetically driven by an actively driven antenna, the parasitic antenna being coupled to a ground plane and not to radio circuitry. Pursuant to a non-limiting example, LB may comprise a first frequency range of 824 MHz-960 MHz, and HB may comprise a second frequency range of 1710 MHz-2170 MHz. It should be understood that these frequency ranges are provided herein solely for illustrative purposes, as other frequency ranges could be utilized in conjunction with various exemplary embodiments of the invention disclosed herein. One advantage of this approach is that the number of frequency bands covered by an antenna may be increased when the physical volume occupied by the antenna is held constant. As another non-limiting example, one may cover the GSM850, 900, 1800, or 1900 bands. Additionally, UMTS bands I, II, III, and IV also may be covered.

The exemplary embodiments of this invention are particularly well suited for use with small multi-band antennas fed by a single-feed radio transceiver. The transceiver may cover two or more frequency bands. The transceiver may combine a plurality of radio frequency bands together and send them to the antenna via a single connection, instead of having separate connections for each radio band. The diplexer then may be considered to be reversed, that is, in conventional usage the diplexer typically has a single feed to the antenna and multiple feeds to split the frequencies received on the antenna to a plurality of different radio circuits, or to combine the frequencies transmitted from each of a plurality of transmitter radio circuits. In the exemplary embodiments of the present invention, the diplexer operates with the HB and LB at a dual-fed antenna. By switching one or more reactances or impedances in the diplexer to provide two or more antenna radiating modes, one obtains coverage across a plurality of frequency bands.

As will be described in detail below, a first reactance or impedance is selectively added between a first antenna and an RF ground and a second reactance or impedance is selectively added between a second antenna and an RF ground. The first and second reactances or impedances are selectively added using RF switches to switch the first and second reactances or impedances in and out of the circuit as required by radio control software. Selectively adding the first and second reactances or impedances to the circuit shifts the operating bandwidth of the first and second antennas from a first frequency band to a second frequency band. This selective addition of the first and second reactances or impedances changes the operation of the radiator and not only the circuitry.

Figure 3:
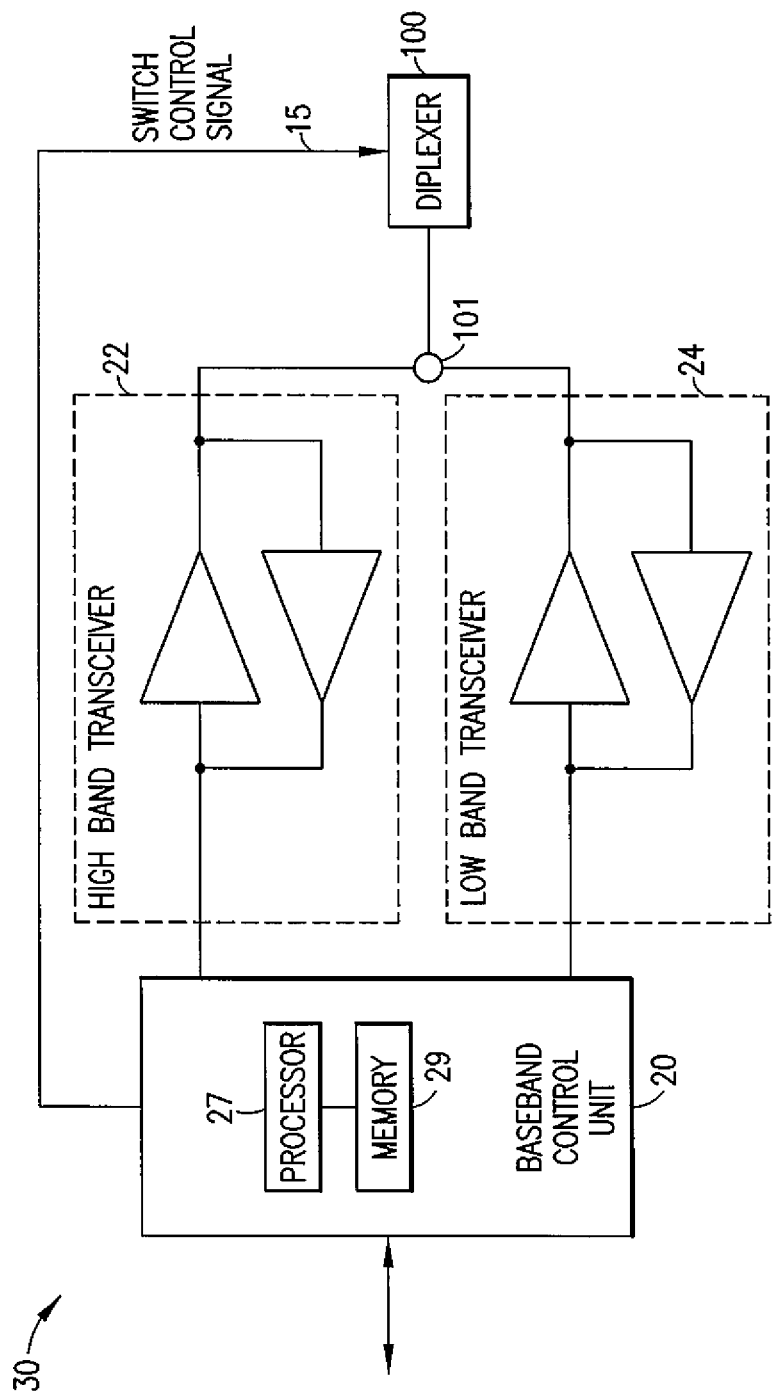
FIG. 3 is a block diagram of a mobile device that includes a high-band transceiver and a low-band transceiver connected with the antenna arrangement of FIG. 1 or FIG. 2.

FIG. 1 is a schematic diagram of an antenna arrangement 100 constructed in accordance with a set of exemplary embodiments of the invention. In addition to comprising a first antenna 151 and a second antenna 152, the antenna arrangement 100 also includes the circuitry and the components shown in FIG. 1. A single input or output port 101 provides an interface to RF circuitry 102. The port 101 may, but need not, provide a nominal RF characteristic impedance of 50 ohms. The RF circuitry 102 may include, for example, a high-band transceiver 22 and a low-band transceiver 24 as shown in FIG. 3. However, it should be appreciated that a single wideband transceiver may be used instead. Returning to FIG. 1, an RF input signal may be applied to the port 101, or an RF output signal may be provided by the port 101, or both. Accordingly, the configuration of the apparatus of FIG. 1 is bidirectional and may be used in conjunction with the transmission as well as the reception of RF signals. Alternatively, the configuration of the apparatus of FIG. 1 may be used only with multiple receivers, or only with multiple transmitters, wherein the configuration of the apparatus would operate only in a unidirectional mode.

The port 101 is connected to a first terminal of a first inductor 103 and a first terminal of a first capacitor 123. The first inductor 103 and the first capacitor 123 may be conceptualized as comprising a diplexer. The first capacitor 123 is in series with the RF signal path and functions in conjunction with inductor 109 as a high pass filter. A second capacitor 121 is connected between a second terminal of the first inductor 103 and an RF ground 160. The first inductor 103 and the second capacitor 121 function as a low pass filter. Accordingly, when an RF input signal in a first frequency band, corresponding to a lower band, is applied to the port 101, the RF signal follows a path defined by the low pass filter comprised of the first inductor 103 and the second capacitor 121. Likewise, when an RF signal in a second frequency band, corresponding to a higher band which is higher than the first frequency band, is applied to the port 101, the RF signal follows a path defined by the high pass filter comprised of the first capacitor 123 and the inductor 109. In this manner, the low pass filter and the high pass filter function as a band separator for separating signals in the first frequency band from signals in the second frequency band.

As indicated previously, the configuration of the apparatus of FIG. 1 is bidirectional. Thus, the high pass filter comprised of the first capacitor 123 and the inductor 109, and the low pass filter comprised of the first inductor 103 and the second capacitor 121, also provide for combining an RF signal in the first frequency band and an RF signal in the second frequency band. In this context, combining means that signals from either or both of the first frequency band and the second frequency band are applied to the port 101, but this combining does not occur simultaneously. In other words, combining may involve receiving a first RF signal in the LB from a first antenna or a first antenna configuration, and receiving a second RF signal in the HB from a second antenna or a second antenna configuration, wherein the first and second RF signals are combined at the port 101 of the diplexer.

A first microstrip line 111 is configured to be operatively coupled between the second terminal of the first inductor 103 and a first terminal of a second inductor 104. As used herein, the term "operatively coupled" may refer to any of the following: connected, directly coupled, capacitively coupled, inductively coupled, electromagnetically coupled, galvanically coupled, or connected via a direct physical connection. A second microstrip line 113 is configured to be operatively coupled between the first terminal of the second inductor 104 and the RF ground 160. The first microstrip line 111 and the second microstrip line 113 function as a matching network for the first frequency band, such as LB, for example. The second microstrip line 113 provides a low impedance at lower frequencies, and thus provides electrostatic discharge (ESD) protection. A first terminal of a third inductor 105 is operatively coupled to the first terminal of the second inductor 104. A second terminal of the second inductor 104 is operatively coupled to a first antenna 151. A second terminal of the third inductor 105 is operatively coupled to a second antenna 152. The second and third inductors 104 and 105 are in series with the RF signal path, and function as low pass filters.

The first antenna 151 is operatively coupled to a first terminal of a first single-pole, single-throw (SPST) switch 141. The second antenna 152 is connected to a first terminal of a second SPST switch 143. A first impedance or reactance is connected between a second terminal of the first SPST switch 141 and the RF ground 160. A second impedance or reactance is connected between a second terminal of the second SPST switch 143 and the RF ground 160. In the example of FIG. 1, the first impedance is a parallel LC circuit comprising a fourth inductor 107 and a third capacitor 125, and the second impedance is a fifth inductor 109. The fifth inductor 109 also functions as a matching network for the second frequency band, such as HB, for example. The inductor 107 and the capacitor 125 act as a matching network for the first antenna 151 to adjust the resonant frequency to the band of interest. Illustratively, the first antenna 151 may, but need not, operate as a parasitic element.

It may be preferable to locate the first SPST switch 141 and the second SPST switch 143 at or near the port 101 to reduce losses at RF frequencies. More specifically, the first and second SPST switches 141, 143 may be placed where the value of Q is of less significance, meaning that there is a reduced probability of harmonic generation caused by the presence of the SPST switches 141, 143.

The first antenna 151 and the second antenna 152 are both used for the first frequency band, such as LB, and a second frequency band, such as FIB. When the first SPST switch 141 and the second SPST switch 143 are both open, then the first antenna 151 functions as a first active driven antenna element for the first frequency band, and the second antenna 152 functions as a second active driven antenna element for the first frequency band. When the first SPST switch 141 and the second SPST switch 143 are both closed, then the first antenna 151 functions as a parasitic antenna element for the second frequency band, and the second antenna 152 functions as an active driven antenna element for the second frequency band. For example, for LB operation, the switches 141, 143 are both open, driving both first and second antennas 151, 152 actively, in other words the RF circuitry 102 is actively connected to both the first and second antennas 151, 152. For HB operation, the switches 141, 143 are both closed, driving only the second antenna 152 actively, while the second antenna 152 is electromagnetically coupled to the first antenna 151, wherein the first antenna 151 acts as a parasitic antenna element.

Figure 2:
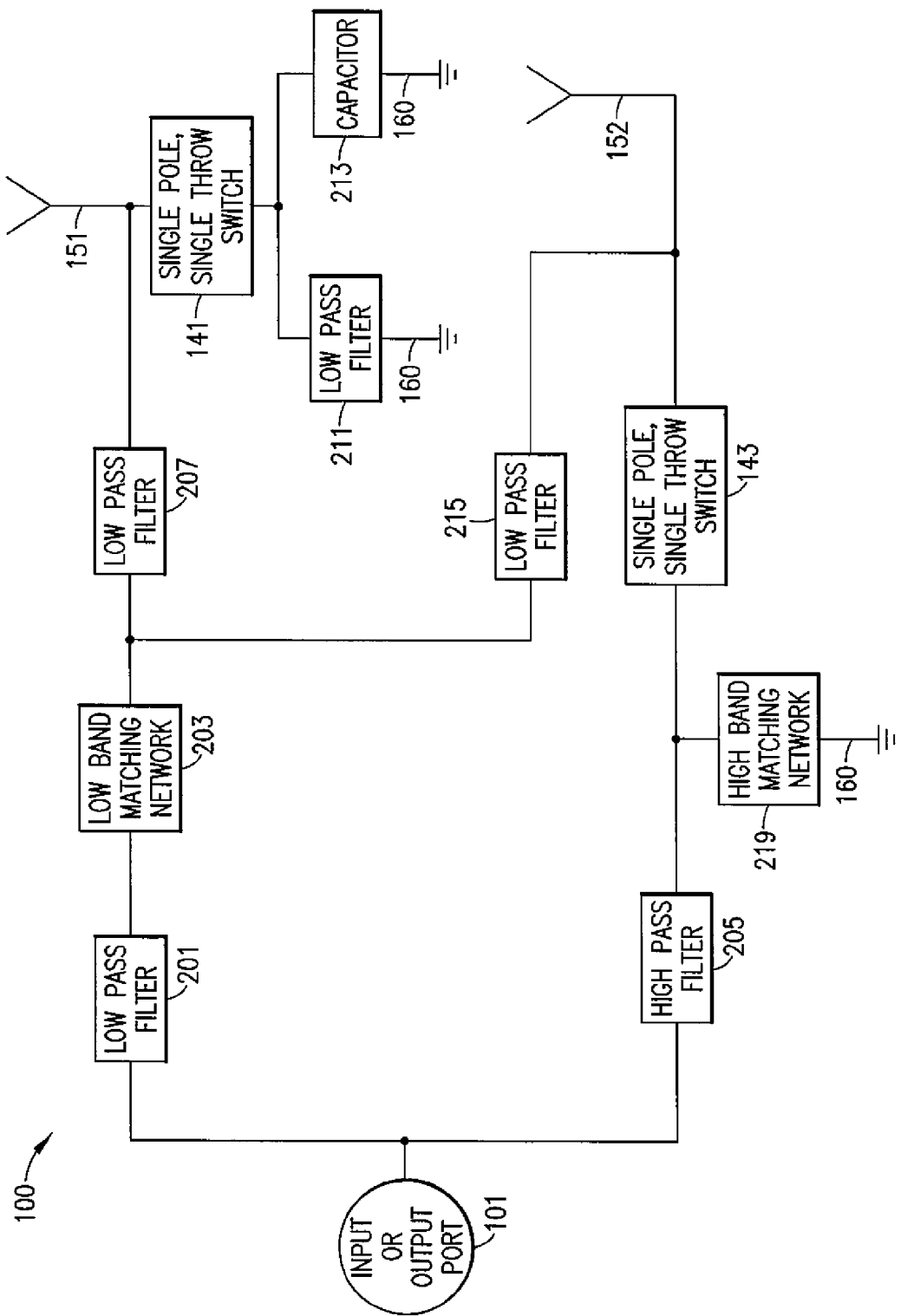
FIG. 2 is a hardware block diagram of an antenna arrangement constructed in accordance with a set of exemplary embodiments of the invention.

FIG. 2 is a hardware block diagram of an antenna arrangement constructed in accordance with a set of exemplary embodiments of the invention. In addition to comprising the first antenna 151 and the second antenna 152, the antenna arrangement 100 also includes the circuitry and the components shown in FIG. 2. As discussed previously, the single input or output port 101 provides an interface to RF circuitry (not illustrated in FIG. 2). The port 101 may, but need not, provide a nominal characteristic impedance of 50 ohms. The RF circuitry may include, for example, a high-band transceiver 22 and a low-band transceiver 24 as shown in FIG. 3. However, it should be appreciated that a single wideband transceiver may be used instead. Returning to FIG. 2, an RF input signal may be applied to the port 101, or an RF output signal may be provided by the port 101, or both. Accordingly, the configuration of the apparatus of FIG. 2 is bidirectional and may be used in conjunction with the transmission as well as the reception of RF signals.

The port 101 is connected to a first terminal of a first low pass filter 201. The port 101 is also connected to a first terminal of a high pass filter 205. Illustratively, the first low pass filter 201 may, but need not, be implemented using the first inductor 103 and second capacitor 121 of FIG. 1. Illustratively, the high pass filter 205 may, but need not, be implemented using the first capacitor 123 and the inductor 109. Accordingly, when an RF input signal in a first frequency band, such as the LB, is applied to the port 101 (FIG. 2), the LB RF signal follows a path defined by the first low pass filter 201. Likewise, when an RF signal in a second frequency band higher than the first frequency band, such as the HB, is applied to the port 101, the HB RF signal follows a path defined by the high pass filter 205. In this manner, the first low pass filter 201 and the high pass filter 205 function as a band separator for separating signals in the first frequency band from signals in the second frequency band.

As indicated previously, the configuration of the apparatus of FIG. 2 is bidirectional. Thus, the high pass filter 205 and the first low pass filter 201 also provide for combining an RF signal in the first frequency band and an RF signal in the second frequency band. In this context, combining means that signals from either or both of the first frequency band and the second frequency band are applied to the port 101.

A second terminal of the first low pass filter 201 is connected to a first terminal of a low band matching network 203. Illustratively, the low band matching network may, but need not, comprise the first microstrip line 111 and the second microstrip line 113 of FIG. 1. Although the low band matching network 203 is illustrated as being a series network in FIG. 2, in other exemplary embodiments the network may be only a shunt network or a combination of series and shunt networks. A second terminal of the low band matching network 203 (FIG. 2) is connected to a first terminal of a second low pass filter 207. The second terminal of the low band matching network 203 is also connected to a first terminal of a third low pass filter 215. The second low pass filter 207 may, but need not, be implemented using the second inductor 104 (FIG. 1). Similarly, the third low pass filter 215 (FIG. 2) may but need not, be implemented using the third inductor 105 (FIG. 1). A second terminal of the second low pass filter 207 (FIG. 2) is connected to the first antenna 151 (FIGS. 1 and 2), and a second terminal of the third low pass filter 215 (FIG. 2) is connected to the second antenna 152 (FIGS. 1 and 2).

A first SPST switch 141 (FIG. 2) is connected between the first antenna 151 and a first terminal of a first impedance. The second terminal of the first impedance is connected to the RF ground 160 (FIGS. 1 and 2). In the illustrative example of FIG. 2, the first impedance may, but need not, be a parallel combination of a fourth low pass filter 211 and a capacitor 213. Other configurations of capacitive reactance or inductive reactance, or both, may be utilized in conjunction with, or in lieu of, the fourth low pass filter 211 and the capacitor 213.

A second terminal of the high pass filter 205 (FIG. 2) is connected to a first terminal of a high band matching network 219, and a second terminal of the high band matching network 219 is connected to the RF ground 160 (FIGS. 1 and 2). Although the high band matching network 219 is illustrated as being a shunt network in FIG. 2, in other exemplary embodiments, the network may be only a series network or a combination of series and shunt networks. Alternatively, one or the other of the high-pass filter 205 and the high band matching network 219 may be eliminated. Illustratively, the high band matching network 219 may, but need not, be implemented using the fifth inductor 109 of FIG. 1. A second SPST switch 143 (FIG. 2) is connected in series between the second terminal of the high pass filter 205 and the second antenna 152 (FIGS. 1 and 2).

With regard to FIG. 2, the first antenna 151 and the second antenna 152 are both used for the first frequency band, such as LB, and a second frequency band, such as HB. When the first SPST switch 141 and the second SPST switch 143 are both open, then the first antenna 151 functions as a first actively driven antenna element for the first frequency band (LB), and the second antenna 152 functions as a second actively driven antenna element for the first frequency band (LB). When the first SPST switch 141 and the second SPST switch 143 are both closed, then the first antenna 151 functions as a parasitic antenna element for the second frequency band (HB), and the second antenna 152 functions as an actively driven antenna element for the second frequency band (HB).

FIG. 3 is a block diagram of a mobile device 30 that includes a high-band transceiver 22 and a low-band transceiver 24 connected with the antenna arrangement 100 including the antennas 151, 152 and the circuitry of FIG. 1 or FIG. 2. The state of the single pole single throw switches 141 and 143 are controlled by an input switch control signal 15 that may be generated, for example, using radio control software. The radio control software may be stored in a non-transitory computer readable memory 29 (FIG. 3) for execution by a processor 27. The memory 29 and the processor 27 may, but need not, be provided in the form of a baseband control unit 20. The baseband control unit 20 may form a portion of a wireless or mobile device 30, such as a multi-band cellular phone. Also included are the high band transceiver 22 and the low band transceiver 24. Band switching may occur while the mobile device 30 is in an active mode, or in a data mode, or in a call mode. The mobile device 30 may be any portable electronic device, including and not limited to, a mobile phone, a smart phone, a multimedia device, an audio device, a music or video player & recorder, a laptop computer, a tablet computer, a wrist watch or other body-worn radio based device, a location based device (for example having GPS or Galileo satellite navigation functionality), a radio device provided in clothing or other human wearable or portable device or object, any of which may or may not have touch input devices.

FIG. 4 is a table listing a number of GSM and UMTS bands that it may be desired to accommodate with the antenna arrangement 100 of FIG. 1 or FIG. 2. The exemplary embodiments of the present invention may encompass, as non-limiting examples, any of the GSM850 band, GSM900 band, GSM1800 band, GSM1900 band, UMTS band I, UMTS band II, UMTS band V, UMTS band VIII or UMTS band IV.

Figure 5:
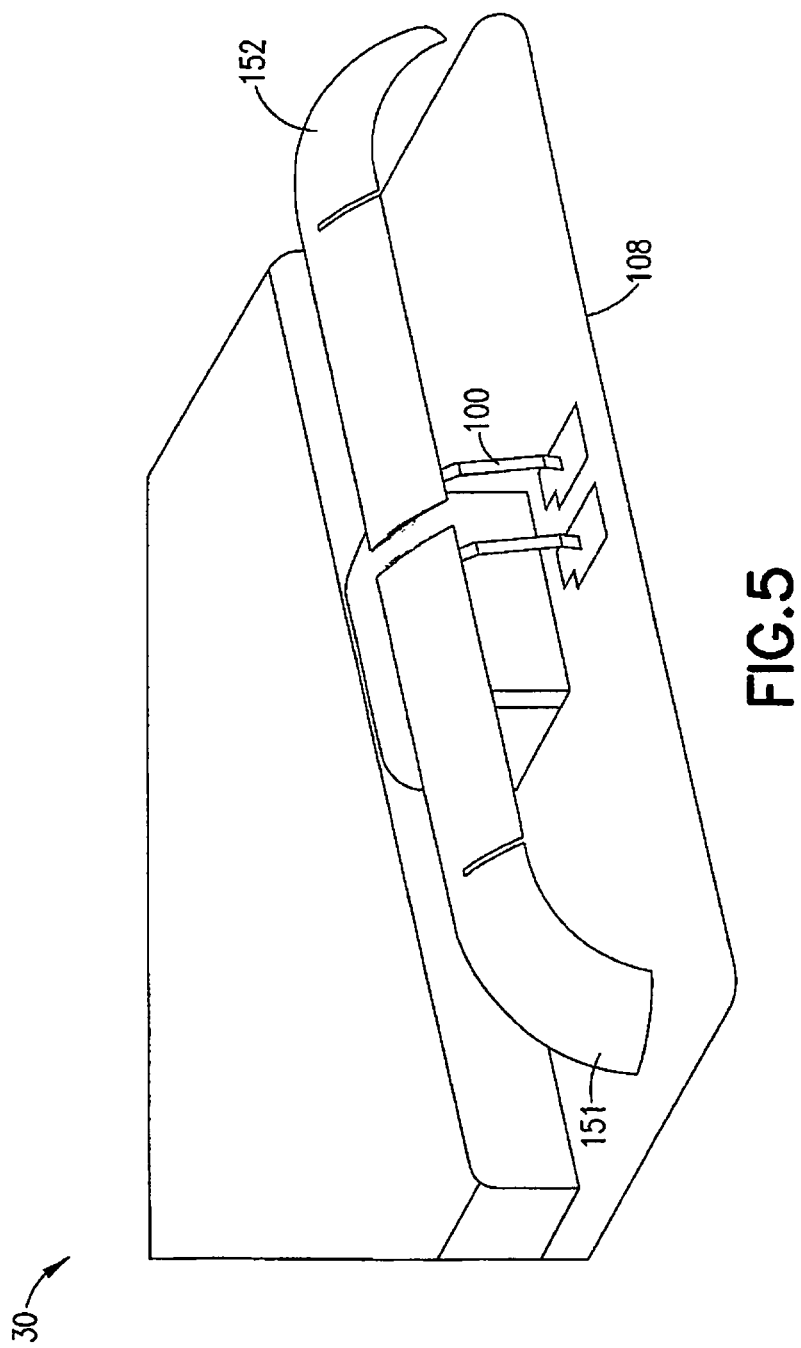
FIG. 5 is a cutout view of an interior portion of a mobile device chassis showing a non-limiting embodiment of the antenna arrangement shown in FIG. 1 or FIG. 2.

FIG. 5 is a cutout view of an interior portion of a mobile device 30 showing a non-limiting embodiment of the antenna arrangement 100 shown in FIG. 1 or FIG. 2. The first antenna 151 and the second antenna 152 provide multi-band operation across a first frequency band as well as a second frequency band in accordance with the state of one or more switches in the antenna arrangement 100. Both the first and second antennas 151, 152 are illustrated in FIG. 5 as a pair of conductive members which are formed in three dimensions so that the members comprise curved portions. In other embodiments, the antennas 151, 152 may be configured as other shapes, or one or more of the antennas may comprise at least a portion which is planar. The antennas 151, 152 may be located such that at least a part of one or more of the antennas is parallel with a printed wiring board (PWB) as illustrated in FIG. 5 or in other embodiments the one or more antenna 151, 152 may comprise a part which is not overlying or in parallel with the PWB. The PWB may or may not comprise one of more portions of a ground plane where the one or more portion is oriented in parallel with the one or more antenna 151, 152. The one or more antennas 151, 152 may comprise at least a portion of the antennas 151, 152 which are arranged to overlay the ground plane, or alternatively at least a portion of one or more of the antennas 151, 152 may be arranged to project beyond the ground plane so that they do not overlay the ground plane. In some exemplary embodiments, the ground plane may only form a portion of the overall area of the PWB, thereby the PWB may also provide areas absent of ground plane. The ground plane may be formed from one or more copper layer of the PWB. Each of the antennas 151, 152 comprises a feed portion which extends up perpendicularly from the PWB and connects to the main radiator portion. The feed portions of each antenna are co-located; in other words they are arranged so that they are adjacent to one another. The antennas 151, 152 may be manufactured from any conductive materials, including and not limited to, metals such as copper, nickel, steel, beryllium copper, gold, silver, tin, zinc, aluminum, or any conductive alloy or combinations of these metals and others. The metals may be manufactured in sheet form or through plating or casting or any other method of providing metal. The conductive material of the antennas 151, 152 may be formed on solid, flexible or semi-flexible substrates or supports, or alternatively may be affixed to an internal or external surface or integrated within an external housing or cover of a portable electronic device. Although the antennas 151, 152 have been illustrated as a single piece of conductive material having a first end connected to the radio circuitry and a second, open end, it should be appreciated that other types of antennas could replace the examples shown, for example and not limited to inverted-L, monopole, dipole, loop, inverted-F antenna, planar inverted-F antenna, planar inverted-L antennas and so on. These alternative antenna types may comprise only an RF feed or they may in addition comprise one or more ground connections and/or one or more feeds provided for tuning a parameter of the antenna. Optionally, the mobile device 30 may be equipped with a camera 108.

Figure 6:
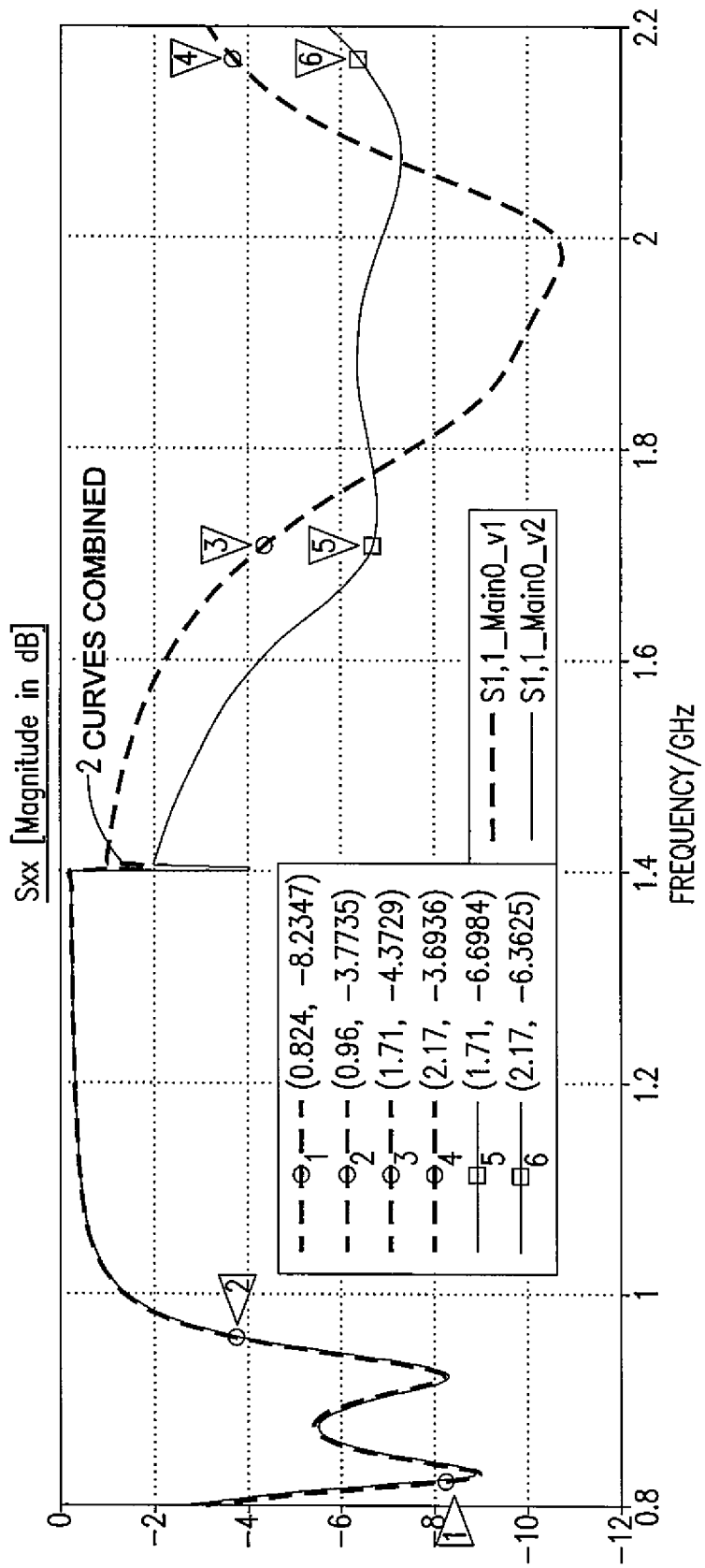
FIG. 6 is an illustrative graph of the magnitude of S11 in dB versus frequency for the antenna arrangement of FIG. 1 or FIG. 2.

FIG. 6 is an exemplary graph of the magnitude of S11 in dB versus frequency in GHz for the antenna arrangement 100 of FIG. 1 or FIG. 2 for a 50 Ohm normalized input impedance. Version 1(v1) and Version 2(v2) illustrate two different tunings which are achieved by changing one or more component values, and the impact of these tuning changes on bandwidth and reflection loss. S11 is the input port voltage reflection coefficient and specifies the return loss of the antenna, or in other words, the portion of incident power that is reflected by the antenna back to a load or RF source. A first marker 1 (FIG. 6) is provided at a frequency of 824 MHz, a second marker 2 is provided at a frequency of 960 MHz, a third marker 3 and a fifth marker 5 are provided at a frequency of 1.71 GHz, and a fourth marker 4 and a sixth marker 6 are provided at a frequency of 2.17 GHz. The diplexer and antenna assembly provides a reasonably good match from 824 MHz to 960 MHz, which may be conceptualized as the first frequency band or the LB. Return loss is in the approximate range of 4 to 9 dB. The diplexer and antenna assembly also provides a reasonably good match from 1.71 GHz to 2.17 GHz, which may be conceptualized as the second frequency band or the HB. Return loss is in the approximate range of 4 to 10 dB. These return loss numbers for LB and HB are quite acceptable for a multi-band antenna design. The graph of FIG. 6 displays a phase transition from LB to HB at approximately 1.4 GHz. This illustrates the "break-point" between the two principle operational states: Switch state 0 (LB) and Switch state 1 (HB).

Figure 7:
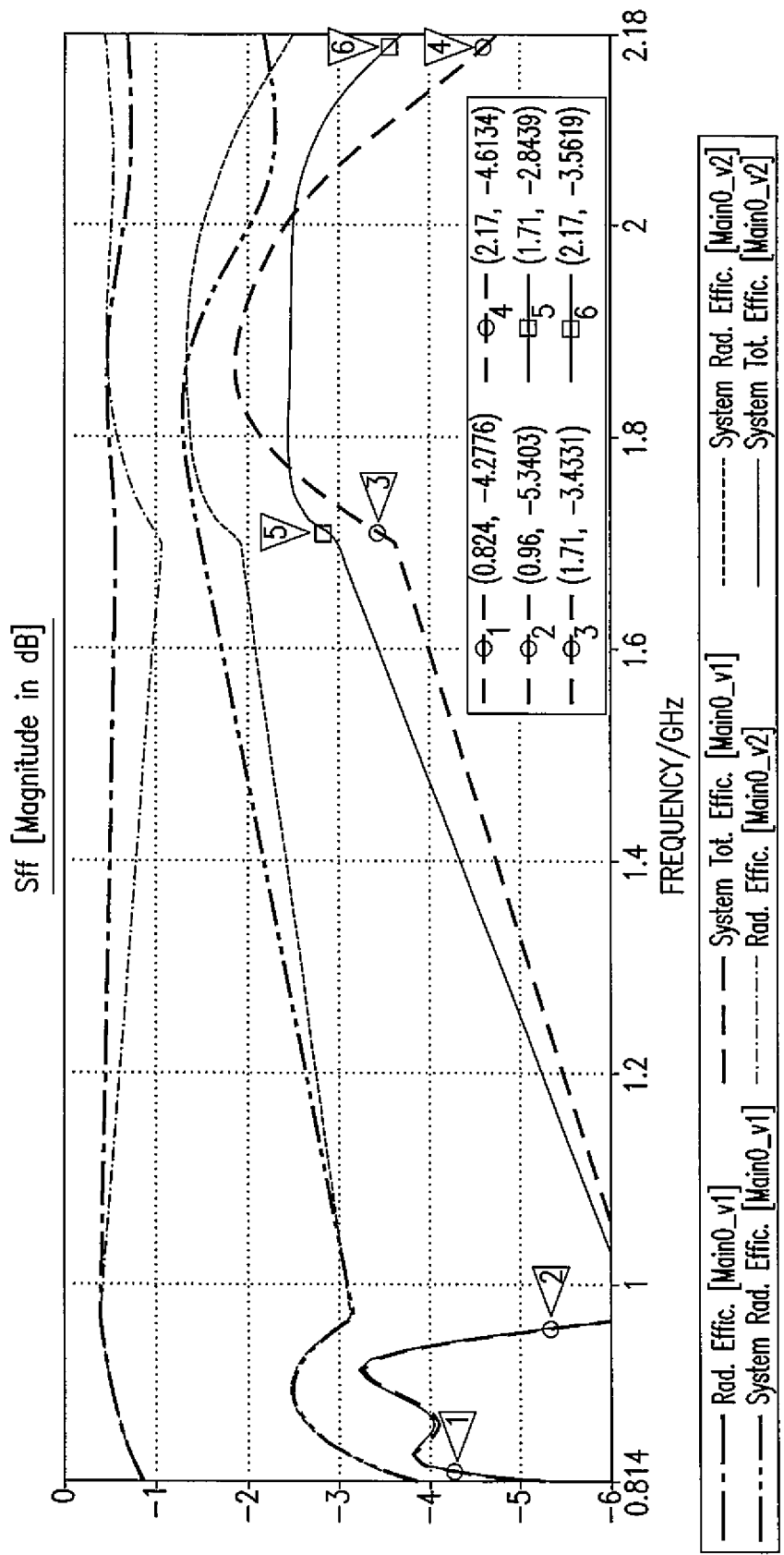
FIG. 7 is an illustrative graph of efficiency in dB versus frequency. The efficiency is shown as system radiation efficiency and system total efficiency for the antenna arrangement of FIG. 1 or FIG. 2.

FIG. 7 is an exemplary graph of the magnitude of S11 in dB versus frequency in GHz showing system radiation and total efficiencies for the antenna arrangement 100 of FIG. 1 or FIG. 2. As with FIG. 6, the example of FIG. 7 provides a first marker 1 at a frequency of 824 MHz, a second marker 2 at a frequency of 960 MHz, a third marker 3 and a fifth marker 5 at a frequency of 1.71 GHz, and a fourth marker 4 and a sixth marker 6 at a frequency of 2.17 GHz. System radiation efficiency ranges from approximately −4 to −6 dB from 824 to 960 MHz, which may be conceptualized as the LB. Similarly, system radiation efficiency ranges from −3 to −5 dB from 1.7 to 2.17 GHz, which may be conceptualized as the HB. These are acceptable values of system radiation efficiency for a compact multi-band antenna design.

Figure 8:
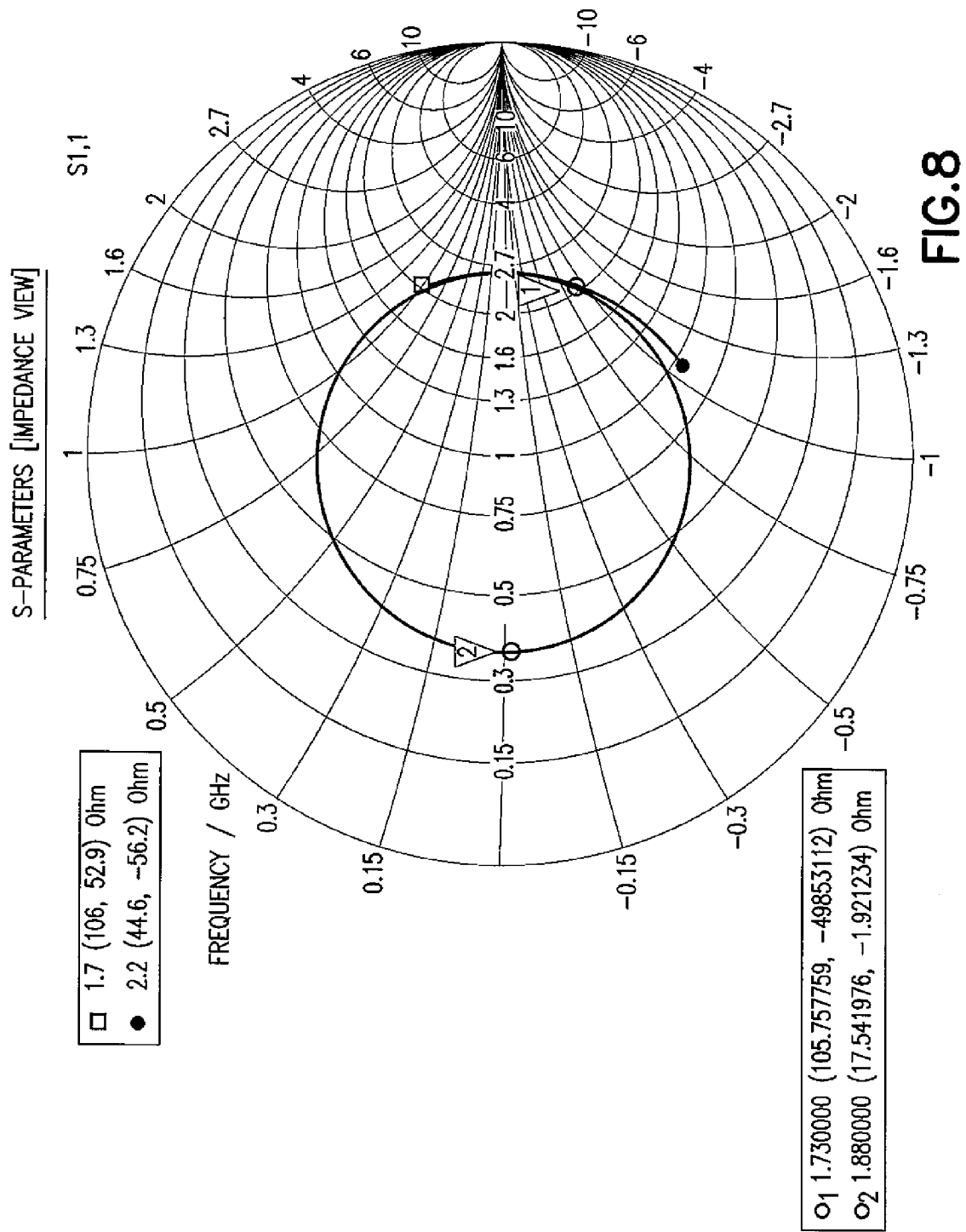
FIG. 8 is an illustrative Smith chart representation showing impedance represented by the scattering parameter S11 from 1.7 GHz to 2.2 GHz for the antenna arrangement of FIG. 1 or FIG. 2.

FIG. 8 is an illustrative Smith chart representation showing impedance (Z) represented by the scattering parameter S11 from 1.7 GHz to 2.2 GHz for the antenna arrangement 100 of FIG. 1 or FIG. 2. At 1.7 GHz, Z is 106+j52.9 ohms. Z shifts to 105.8-j49.9 ohms at 1.73 GHz, and to 17.5-j1.9 ohms at 1.88 GHz, and then to 44.6-j56.2 ohms at 2.2 GHz.

Figure 9:
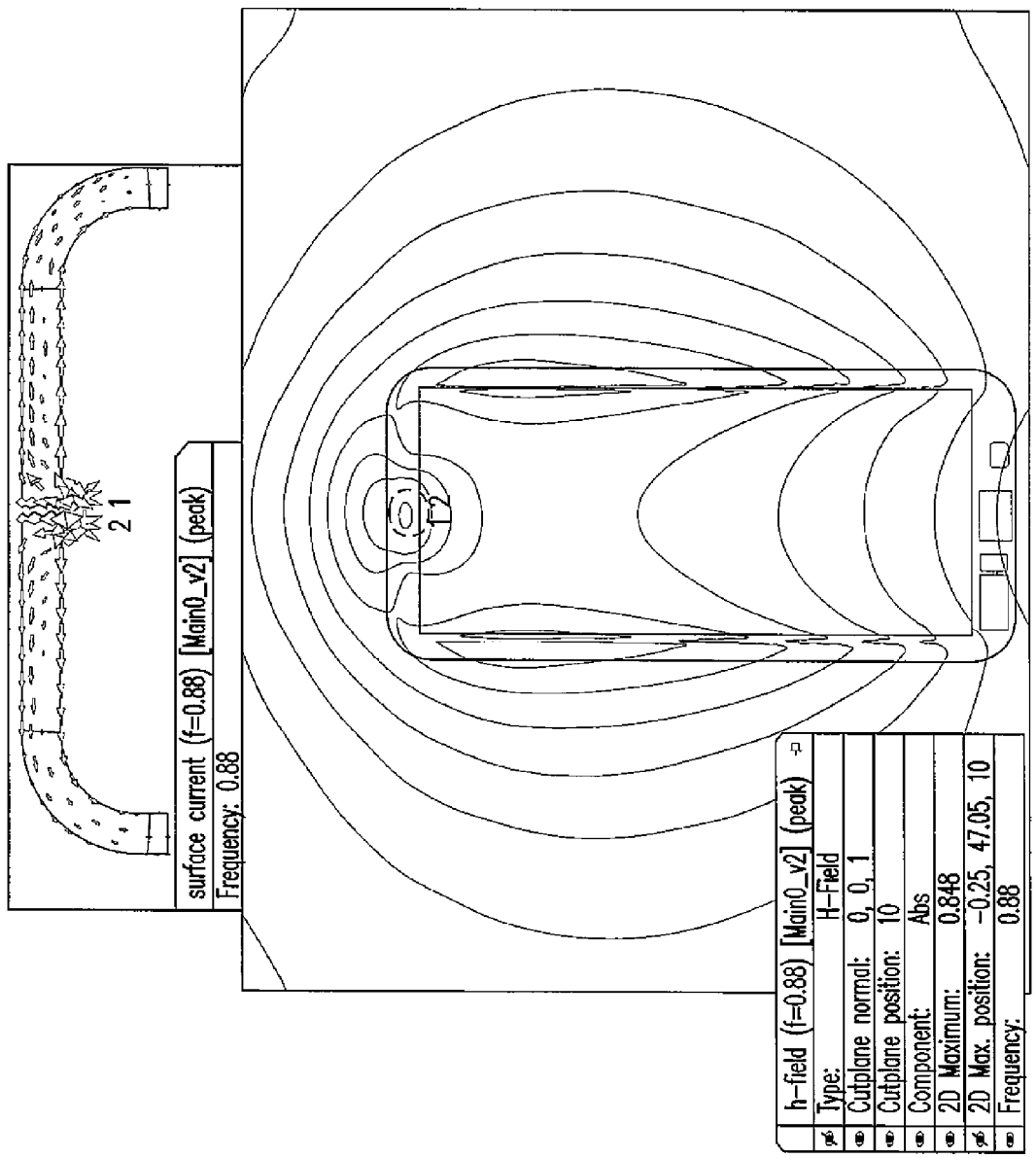
FIGS. 9 and 10 are pictorial representations of electromagnetic field strength in the vicinity of a mobile phone using the antenna arrangement shown in FIG. 1 or FIG. 2.
Figure 10:
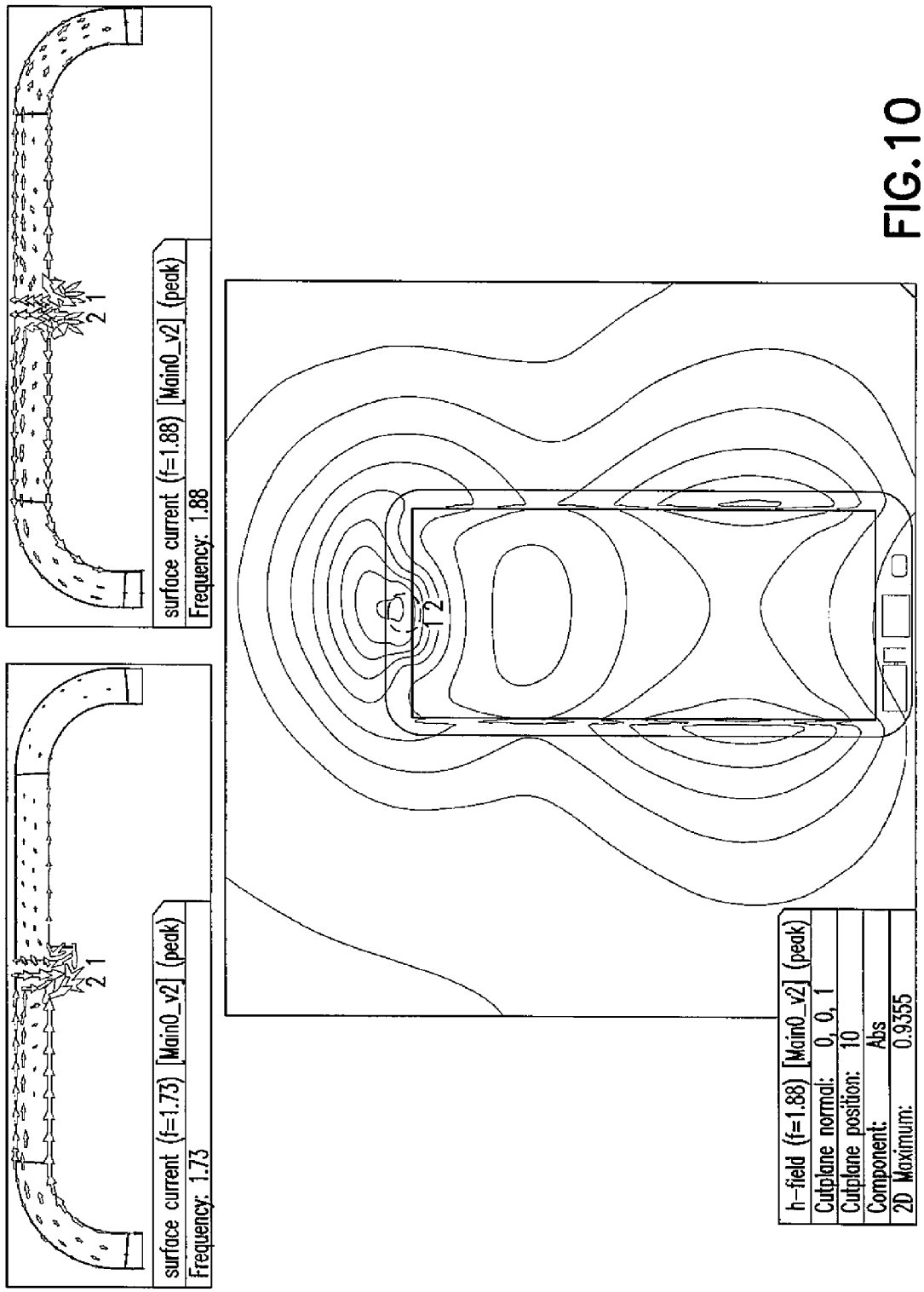

FIGS. 9 and 10 are pictorial representations of electromagnetic field strength in the vicinity of a mobile phone using the antenna arrangement 100 shown in FIG. 1 or FIG. 2. FIGS. 9 and 10 illustrate the H-field component of the electromagnetic field. The electromagnetic fields are less concentrated than is the case for conventional multi-band antenna designs and no localized "hot spots" of intense field strength are present. In this manner, the diplexer and antenna configurations described herein provide improved SAR performance relative to conventional designs.

Figure 11:
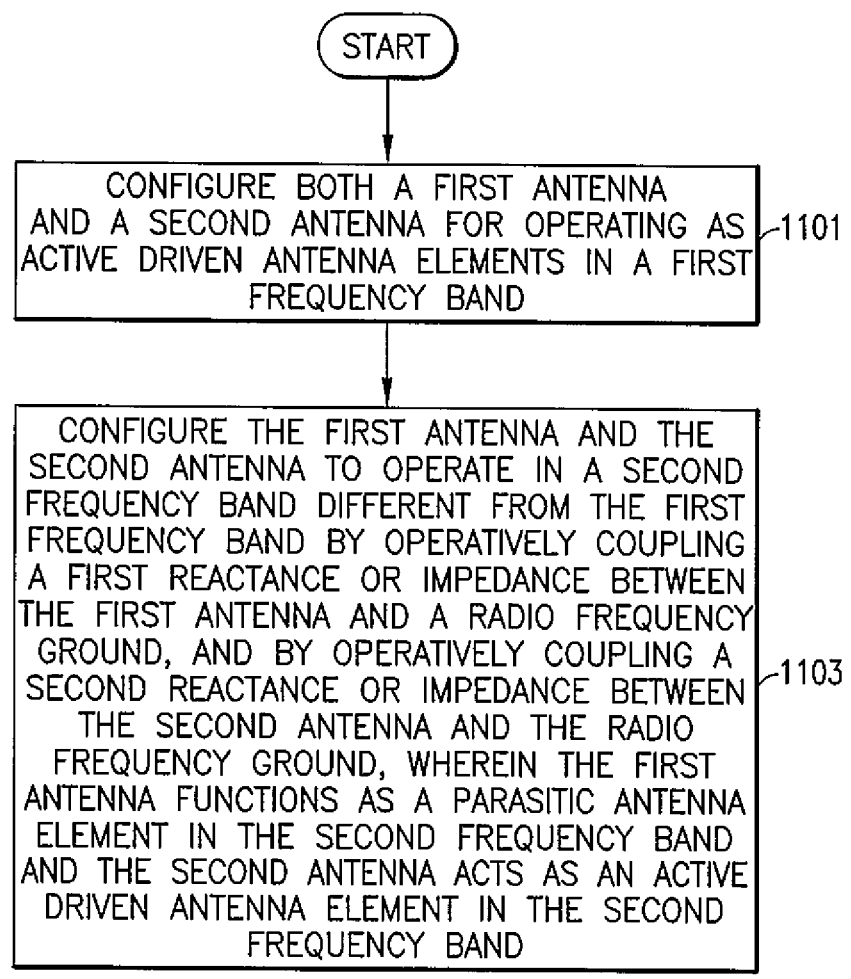
FIG. 11 is a flowchart setting forth an illustrative method for providing a multiband on-ground antenna with a dual radiator arrangement in accordance with a set of exemplary embodiments of the invention.

FIG. 11 is a flowchart setting forth an illustrative method for providing a multiband on-ground antenna with a dual radiator arrangement in accordance with a set of exemplary embodiments of the invention. The method commences at block 1101 where a first antenna and a second antenna are both configured for operating as active driven antenna elements in a first frequency band. Next, at block 1103, the first antenna and the second antenna are configured to operate in a second frequency band different from the first frequency band by operatively coupling a first reactance or impedance between the first antenna and a radio frequency ground, and by operatively coupling a second reactance or impedance between the second antenna and the radio frequency ground, wherein the first antenna functions as a parasitic antenna element in the second frequency band and the second antenna as an active driven antenna element in the second frequency band.

The various processors, memories, programs, transceivers and antennas depicted in FIG. 3 may all be considered to represent means for performing operations and functions that implement the several non-limiting aspects and embodiments of the invention. The computer-readable memory 29 may be of any type suitable to the local technical environment and may be implemented using any suitable data storage technology, such as semiconductor-based memory devices, random access memory, read only memory, programmable read only memory, flash memory, magnetic memory devices and systems, optical memory devices and systems, fixed memory and removable memory. The processor 27 may be of any type suitable to the local technical environment, and may comprise one or more of general purpose computers, special purpose computers, microprocessors, digital signal processors (DSPs), and processors based on multi-core processor architectures, as non-limiting examples.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    providing a first antenna and a second antenna both configured for operating as active driven antenna elements in a first frequency band; and
    configuring the first antenna and the second antenna to operate in a second frequency band different from the first frequency band,
    wherein the configuring comprises:
        operatively coupling a first impedance between the first antenna and a radio frequency ground, and
        operatively coupling a second impedance between the second antenna and the radio frequency ground,
    wherein selectively adding the first and second impedances to a circuit shifts the operating bandwidth of the first and second antennas from a first frequency band to a second frequency band; and
    wherein the first and second impedances are selectively added using radio frequency switches to switch the first and second impedances in and out of the circuit.

2. The method of claim 1 wherein the first frequency band is in a lower frequency range than the second frequency band.

3. The method of claim 1 wherein the first impedance comprises an inductance in parallel with a capacitance.

4. The method of claim 1 wherein the first antenna is configured to function as a parasitic antenna element in the second frequency band in response to the second antenna being configured to function as an active driven antenna element in the second frequency band, the first antenna being electromagnetically coupled to the second antenna, and the first antenna being coupled to a ground plane.

5. The method of claim 1 further comprising providing at least one switch having an open state and a closed state, the closed state connecting the first impedance between the first antenna and the radio frequency ground, and the closed state connecting the second impedance between the second antenna and the radio frequency ground.

6. The method of claim 5 further comprising the at least one switch responding to a first control signal by changing from the open state to the closed state, and responding to a second control signal by changing from the closed state to the open state.

7. The method of claim 6 further comprising generating the first control signal in response to operating in the second frequency band, and generating the second control signal in response to operating in the first frequency band.

8. The method of claim 1 further comprising configuring both the first antenna and the second antenna as active antenna elements for the first frequency band.

9. The method of claim 1, executed in a portable electronic device.

10. An apparatus comprising:
    at least one switch having an open state and a closed state;
    a first antenna configured for operating as a first active driven antenna element in a first frequency band in response to the at least one switch being in the open state;
    a second antenna configured for operating as a second active driven antenna element in the first frequency band in response to the at least one switch being in the open state;
    wherein the closed state configures the first antenna and the second antenna to operate in a second frequency band different from the first frequency band,
    wherein the configuring comprises:
        operatively coupling a first impedance between the first antenna and a radio frequency ground, and
        operatively coupling a second impedance between the second antenna and the radio frequency ground,
    wherein selectively adding the first and second impedances to a circuit shifts the operating bandwidth of the first and second antennas from a first frequency band to a second frequency band; and wherein the first and second impedances are selectively added using radio frequency switches to switch the first and second impedances in and out of the circuit.

11. The apparatus of claim 10 wherein the first frequency band is in a lower frequency range than the second frequency band.

12. The apparatus of claim 10 wherein the first impedance comprises an inductance in parallel with a capacitance.

13. The apparatus of claim 10 wherein the first antenna is configured to function as a parasitic antenna element in the second frequency band in response to the second antenna being configured to function as an active driven antenna element in the second frequency band, the first antenna being electromagnetically coupled to the second antenna, and the first antenna being coupled to a ground plane.

14. The apparatus of claim 10 wherein the at least one switch includes a control signal input that responds to a first control signal by changing from the open state to the closed state, and that responds to a second control signal by changing from the closed state to the open state.

15. The apparatus of claim 14 further comprising a processor, configured to be operatively coupled to the at least one switch, for generating the first control signal and for generating the second control signal.

16. The apparatus of claim 15 further comprising:
a radio frequency transceiver configured to be operatively coupled to the first antenna and the second antenna, and
a non-transitory computer readable memory configured to be operatively coupled to the processor, the memory storing a set of computer executable instructions which, upon execution, perform at least the following:
generating the first control signal in response to the radio frequency transceiver operating in the second frequency band, and
generating the second control signal in response to the radio frequency transceiver operating in the first frequency band.

17. The apparatus of claim 10 further comprising an input/output interface configured for accepting a radio frequency input signal and for providing a radio frequency output signal.

18. The apparatus of claim 17 further comprising a diplexer operatively coupled between the input/output interface, and both of the first antenna and the second antenna.

19. A portable electronic device comprising the apparatus according to claim 10.

20. The apparatus of claim 10, wherein the apparatus is a portable electronic device further comprising:
user interface circuitry and user interface software configured to facilitate user control of at least some functions of the portable electronic device through use of a display and configured to respond to user input; and
a display and display circuitry configured to display at least a portion of a user interface of the portable electronic device, the display and display circuitry configured to facilitate user control of at least some functions of the portable electronic device.

21. A circuit arrangement comprising:
at least one switch having an open state and a closed state;
a first antenna configured for operating as a first active driven antenna element in a first frequency band in response to the at least one switch being in the open state;
a second antenna configured for operating as a second active driven antenna element in the first frequency band in response to the at least one switch being in the open state;

wherein the closed state configures the first antenna and the second antenna to operate in a second frequency band different from the first frequency band,
wherein the configuring comprises:
operatively coupling a first impedance between the first antenna and a radio frequency ground, and
operatively coupling a second impedance between the second antenna and the radio frequency ground,
wherein selectively adding the first and second impedances to the circuit arrangement shifts the operating bandwidth of the first and second antennas from a first frequency band to a second frequency band; and
wherein the first and second impedances are selectively added using radio frequency switches to switch the first and second impedances in and out of the circuit arrangement.

22. The circuit arrangement of claim 21 wherein the first frequency band is in a lower frequency range than the second frequency band.

23. The circuit arrangement of claim 21 wherein the first impedance comprises an inductance in parallel with a capacitance.

24. The circuit arrangement of claim 21 wherein the first antenna is configured to function as a parasitic antenna element in the second frequency band and the second antenna as an active driven antenna element in the second frequency band.

25. The circuit arrangement of claim 21 wherein the at least one switch includes a control signal input that responds to a first control signal by changing from the open state to the closed state, and that responds to a second control signal by changing from the closed state to the open state.

26. The circuit arrangement of claim 25 further comprising a processor, operatively coupled to the at least one switch, for generating the first control signal and for generating the second control signal.

27. The circuit arrangement of claim 26 further comprising:
a radio frequency transceiver configured to be operatively coupled to the first antenna and the second antenna, and
a non-transitory computer readable memory configured to be operatively coupled to the processor, the memory storing a set of computer executable instructions which, upon execution, perform at least the following:
generating the first control signal in response to the radio frequency transceiver operating in a high frequency band, and
generating the second control signal in response to the radio frequency transceiver operating in a lower frequency band that is lower in frequency than the high frequency band.

28. The circuit arrangement of claim 21 further comprising an input/output interface configured for accepting a radio frequency input signal and for providing a radio frequency output signal.

29. The circuit arrangement of claim 21 further comprising a diplexer operatively coupled between the input/output interface, and both of the first antenna and the second antenna.

30. An apparatus comprising at least one processor and at least one memory including computer program code for one or more programs, the at least one memory and the computer program code being configured, with the at least one processor, to cause the apparatus to perform at least:
configuring a first antenna and a second antenna for operating as active driven antenna elements in a first frequency band; and configuring the first antenna and the second antenna to operate in a second frequency band different from the first frequency band,
wherein the configuring comprises:
operatively coupling a first impedance between the first antenna and a radio frequency ground, and
operatively coupling a second impedance between the second antenna and the radio frequency ground,
wherein selectively adding the first and second impedances to a circuit shifts the operating bandwidth of the first and second antennas from a first frequency band to a second frequency band; and
wherein the first and second impedances are selectively added using radio frequency switches to switch the first and second impedances in and out of the circuit, and
wherein the first antenna functions as a parasitic antenna element in the second frequency band and the second antenna as an active driven antenna element in the second frequency band.

31. A non-transitory computer-readable storage medium carrying one or more sequences of one or more instructions which, when executed by one or more processors, cause an apparatus to perform at least the method according to claim 1.

32. A computer program product including one or more sequences of one or more instructions which, when executed by one or more processors, cause an apparatus to at least perform the method according to claim 1.

* * * * *